United States Patent
Kartoun et al.

(10) Patent No.: US 12,081,547 B2
(45) Date of Patent: Sep. 3, 2024

(54) ENHANCING INVESTMENT ACCOUNT SECURITY

(71) Applicant: INTERNATIONAL BUSINESS MACHINES CORPORATION, Armonk, NY (US)

(72) Inventors: Uri Kartoun, Cambridge, MA (US); Sophie Batchelder, Cambridge, MA (US); Sophia O Smith, Boston, MA (US); Jayanth Krishnan, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 379 days.

(21) Appl. No.: 17/448,541

(22) Filed: Sep. 23, 2021

(65) Prior Publication Data
US 2023/0092596 A1 Mar. 23, 2023

(51) Int. Cl.
*H04L 9/40* (2022.01)
*G06Q 20/40* (2012.01)
(Continued)

(52) U.S. Cl.
CPC ......... *H04L 63/10* (2013.01); *G06Q 20/4016* (2013.01); *G06Q 20/405* (2013.01);
(Continued)

(58) Field of Classification Search
CPC . H04L 63/10; H04L 63/1433; G06Q 20/4016; G06Q 20/405; G06Q 40/02; G06Q 40/06; G06Q 20/227; G06Q 20/389
See application file for complete search history.

(56) References Cited

U.S. PATENT DOCUMENTS

| | | |
|---|---|---|
| 5,774,059 A | 6/1998 | Henry |
| 7,389,388 B2 | 6/2008 | Cantin |

(Continued)

FOREIGN PATENT DOCUMENTS

CN    102867362 A    1/2013

OTHER PUBLICATIONS

Anonymous, "Account Data Security at Fidelity," Fidelity.com, [overview], [accessed on Aug. 12, 2021], 4 pages, Retrieved from the Internet: <URL: https://www.fidelity.com/security/overview>.

(Continued)

*Primary Examiner* — Huan V Doan
(74) *Attorney, Agent, or Firm* — Elliot J. Shine

(57) ABSTRACT

A method, computer system, and a computer program product for account security is provided. The present invention may include analyzing one or more financial accounts of a user and assigning a risk threshold to each of the one or more financial accounts. The present invention may include monitoring a vulnerability of each of the one or more financial accounts, wherein the vulnerability is monitored using a vulnerability score, the vulnerability score being generated based on user data. The present invention may include determining the risk threshold has been exceeded for at least one financial account based on a comparison of the vulnerability score and the risk threshold of the at least one financial account. The present invention may include preventing access to the at least one financial account in which the risk threshold has been exceeded.

20 Claims, 5 Drawing Sheets

(51) Int. Cl.
*G06Q 40/02* (2023.01)
*G06Q 40/06* (2012.01)

(52) U.S. Cl.
CPC ......... *G06Q 40/02* (2013.01); *H04L 63/1433* (2013.01); *G06Q 40/06* (2013.01)

(56) References Cited

U.S. PATENT DOCUMENTS

| | | | |
|---|---|---|---|
| 10,614,208 | B1 | 4/2020 | Edwards |
| 10,666,669 | B2 | 5/2020 | Balasubramanian |
| 10,819,776 | B2 | 10/2020 | Beveridge |
| 11,037,160 | B1* | 6/2021 | Kolls ................. G06Q 20/4016 |
| 11,748,757 | B1* | 9/2023 | Segal .................. G06Q 20/409 705/44 |
| 2018/0033089 | A1* | 2/2018 | Goldman .............. H04L 63/102 |
| 2018/0159882 | A1 | 6/2018 | Brill |
| 2019/0220863 | A1* | 7/2019 | Novick ................. G06Q 20/10 |
| 2021/0133286 | A1* | 5/2021 | Yang .................... G06F 40/216 |
| 2021/0158348 | A1* | 5/2021 | Wardman ................ H04W 4/24 |
| 2022/0366078 | A1* | 11/2022 | Kirti ...................... G06N 5/022 |

OTHER PUBLICATIONS

Anonymous, "Hear Rate," dev.fitbit.com [reference], [accessed on Aug. 12, 2021], 8 pages, Retrieved from the Internet: <URL: https://dev.fitbit.com/build/reference/web-api/heart-rate/>.

Anonymous, "IP Strategy Report: Technology disruption through a patent lens," Cipher.ai [report], Jul. 2018, 36 pages, Aistemos Limited, London, UK, Retrieved from the Internet: <URL: https://cipher.ai/wp-content/uploads/2020/04/Cipher-IP-Strategy-Report-2018-min-min_compressed.pdf>.

Anonymous, "Planning Guide Cloud Security," Intel.com Guide [online], May 2012, 26 pages, Retrieved from the Internet: <URL: https://www.intel.com/content/dam/www/public/us/en/documents/guides/cloud-computing-security-planning-guide2.pdf>.

Disclosed Anonymously, "Cognitive deployment engine for containers in a Hybrid Cloud context," IP.com, Jan. 26, 201, 8 pages, IP.com No. IPCOM000264781D, Retrieved from the Internet: <URL: https://priorart.ip.com/IPCOM/000264781>.

Disclosed Anonymously, "Matching As A Service—A Cloud based Approach to Probabilistic Data Matching," IP.com, Jan. 28, 2014, 7 pages, IP.com No. IPCOM000234680D, Retrieved from the Internet: <URL: https://priorart.ip.com/IPCOM/000234680>.

Disclosed Anonymously, "System and Method for Dynamic Resource Management Based on Risk Aware Metrics," IP.com, Nov. 15, 2016, 4 pages, IP.com No. IPCOM000248308D, Retrieved from the Internet: <URL: https://priorart.ip.com/IPCOM/000248308>.

IBM, "IBM Cloud for Financial Services," IBM cloud, May 2020, 7 pages, IBM corporation, Retrieved from the Internet: <URL: https://www.ibm.com/cloud/financial-services>.

IBM, "Tailoring hybrid cloud for banking," IBM Institute for Business Value [executive report], 2017, 20 pages, IBM Corporation, Retrieved from the Internet: <URL: https://www.ibm.com/downloads/cas/74KLAO6J>.

Jouini, et al., "A Security Framework for Secure Cloud Computing Environments," International Journal of Cloud Applications and Computing [article], Jul. 2016, 14 pages, vol. 6, Issue 3, ResesarchGate, DOI:10.4018/IJCAC.2016070103, Retrieved from the Internet: <URL: https://www.researchgate.net/publication/305416491_A_Security_Framework_for_Secure_Cloud_Computing_Environments>.

Mell, et al., "The NIST Definition of Cloud Computing", National Institute of Standards and Technology, Special Publication 800-145, Sep. 2011, 7 pages.

Newman, "Executive's Guide to Cloud Access Security Brokers," 2015, 9 pages, QuinnStreet, Inc., Retrieved from the Internet: <URL: https://www.ciosummits.com/Online_Assets_Bitglass_Executives_Guide_to_CASBs.pdf>.

Stanley, et al., "Distributed Ensemble Learning for Provisioning Indices, Actions, and Inputs for Assurance and Performance," IP.com, Feb. 6, 2018, 12 pages, Cisco Systems, Inc., IP.com No. IPCOM000252743D, Retrieved from the Internet: <URL: https://priorart.ip.com/IPCOM/000252743>.

* cited by examiner

ENHANCING INVESTMENT ACCOUNT SECURITY

BACKGROUND

The present invention relates generally to the field of computing, and more particularly to cyber security and/or online account security.

Financial institutions may continuously make improvements to the products they offer to customers in order to improve the user experience. One of the primary methods of improving the user experience may be security and/or protection of financial accounts. Financial institutions may apply a variety of methods in protecting financial accounts of their customers. Such methods may include, but are not limited to including, usernames, passwords, and/or one or more security questions, amongst other methods. Additionally, specific functions, such as transferring funds out of an account, may be locked while allowing the user to still perform standard actions, such as, but not limited to, bill paying, trading, and receiving funds.

A user's financial account may be more susceptible to cyber-attacks and/or other fraudulent behavior based on a user's availability, location, control of bank cards and/or devices, amongst other factors.

SUMMARY

Embodiments of the present invention disclose a method, computer system, and a computer program product for account security. The present invention may include analyzing one or more financial accounts of a user and assigning a risk threshold to each of the one or more financial accounts. The present invention may include monitoring a vulnerability of each of the one or more financial accounts, wherein the vulnerability is monitored using a vulnerability score, the vulnerability score being generated based on user data. The present invention may include determining the risk threshold has been exceeded for at least one financial account based on a comparison of the vulnerability score and the risk threshold of the at least one financial account. The present invention may include preventing access to the at least one financial account in which the risk threshold has been exceeded.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
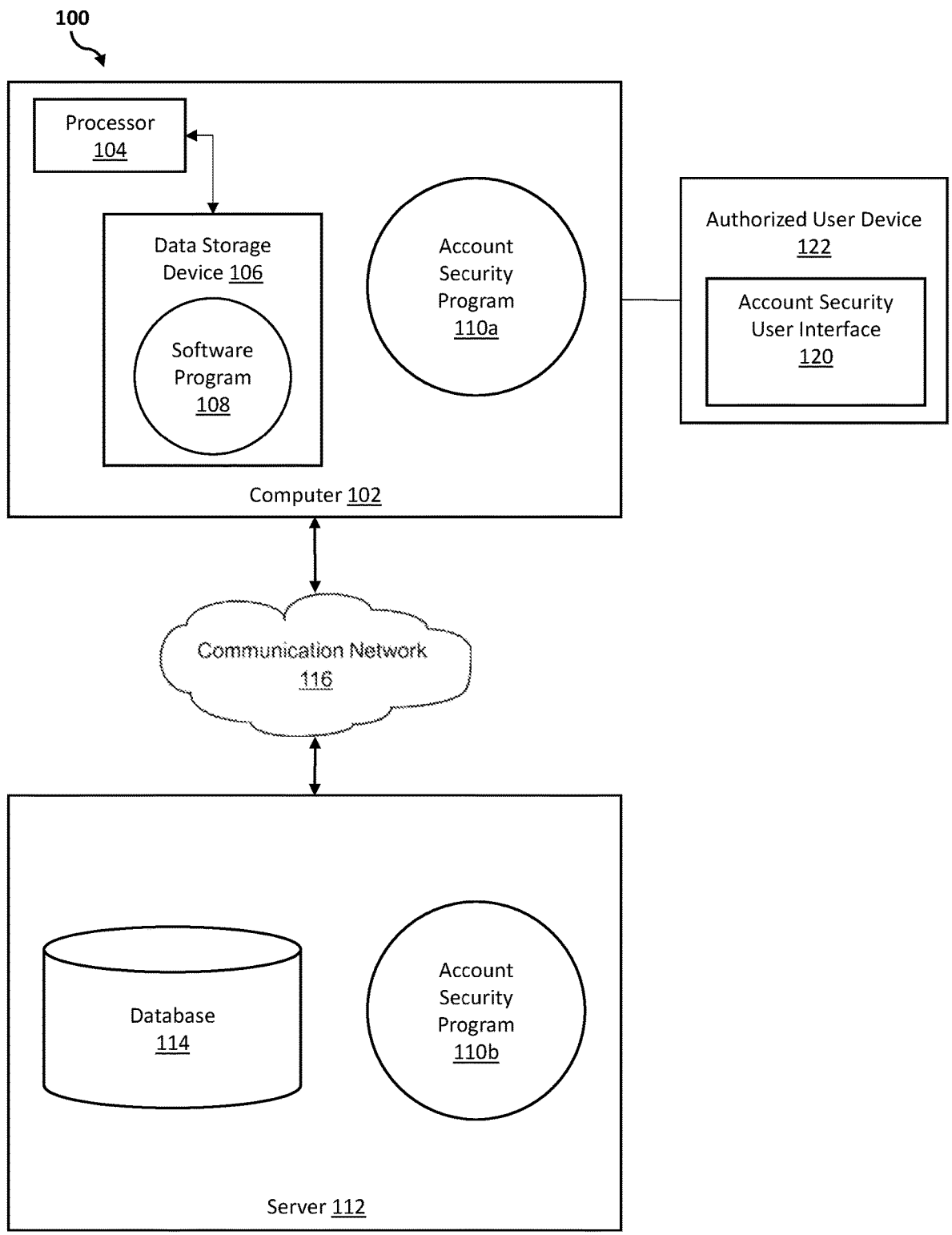
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for account security. As such, the present embodiment has the capacity to improve the technical field of cyber security and/or online account security by preventing access to at least one financial account in which the risk threshold has been exceeded. More specifically, the present invention may include analyzing one or more financial accounts of a user and assigning a risk threshold to each of the one or more financial accounts. The present invention may include monitoring a vulnerability of each of the one or more financial accounts, wherein the vulnerability is monitored using a vulnerability score, the vulnerability score being generated based on user data. The present invention may include determining the risk threshold has been exceeded for at least one financial account based on a comparison of the vulnerability score and the risk threshold of the at least one financial account. The present invention may include preventing access to the at least one financial account in which the risk threshold has been exceeded.

As described previously, Financial institutions may continuously make improvements to the products they offer to customers in order to improve the user experience. One of the primary methods of improving the user experience may be security and/or protection of financial accounts. Financial institutions may apply a variety of methods in protecting financial accounts of their customers. Such methods may include, but are not limited to including, usernames, passwords, and/or one or more security questions, amongst other methods. Additionally, specific functions, such as transferring funds out of an account, may be locked while allowing the user to still perform standard actions, such as, but not limited to, bill paying, trading, and receiving funds.

A user's financial account may be more susceptible to cyber-attacks and/or other fraudulent behavior based on a user's availability, location, control of bank cards and/or devices, amongst other factors.

Therefore, it may be advantageous to, among other things, analyze one or more financial accounts of a user, monitor a vulnerability of each of the one or more financial accounts, determine a risk threshold has been exceeded for at least one financial account, and prevent access to the at least one financial account in which the risk threshold has been exceeded.

According to at least one embodiment, the present invention may improve recognition of financial account vulnerabilities by monitoring the vulnerability of each financial account of the user in real time using a vulnerability score. The vulnerability score being updated in real time based on user data received.

According to at least one embodiment, the present invention may improve the prevention of fraudulent transactions by providing one or more recommendations relating to financial security prior to a determination that a risk threshold may be exceeded for at least one financial account.

According to at least one embodiment, the present invention may improve the prevention of fraudulent transactions utilizing different methods in preventing access to at least one financial account of the user based on at least user data and/or previously identified vulnerabilities.

According to at least one embodiment, the present invention may improve the prevention of fraudulent transactions by utilizing one or more methods of regaining access to the at least one financial account, the methods of regaining access being designed to prevent bad actors from using at least jeopardized user devices in regaining access.

According to at least one embodiment, the present invention may improve the ability of financial institutions to reduce fraud liability by utilizing a safety score for the financial account of the user which a financial institution may attach to incentives.

According to at least one embodiment, the present invention may improve user safety by enabling the utilization of variable pin codes and/or alternate passwords for discrete communication of a vulnerability risk for an authorized user device. The utilization of the variable pin codes and/or alternate passwords may allow a user interface to display financial transactions as if they are being performed.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an account security program 110a. The networked computer environment 100 may also include a server 112 that is enabled to run an account security program 110b that may interact with a database 114 and a communication network 116. The networked computer environment 100 may include a plurality of computers 102 and servers 112, only one of which is shown. The networked computer environment also may include an authorized user device 122, only one or which is shown, the authorized user device 122 capable of accessing the account security user interface 120. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the account security program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the account security program 110a, 110b (respectively) to present access to a financial account of a user when a risk threshold has been exceeded. The account security method is explained in more detail below with respect to FIG. 2.

Figure 2:
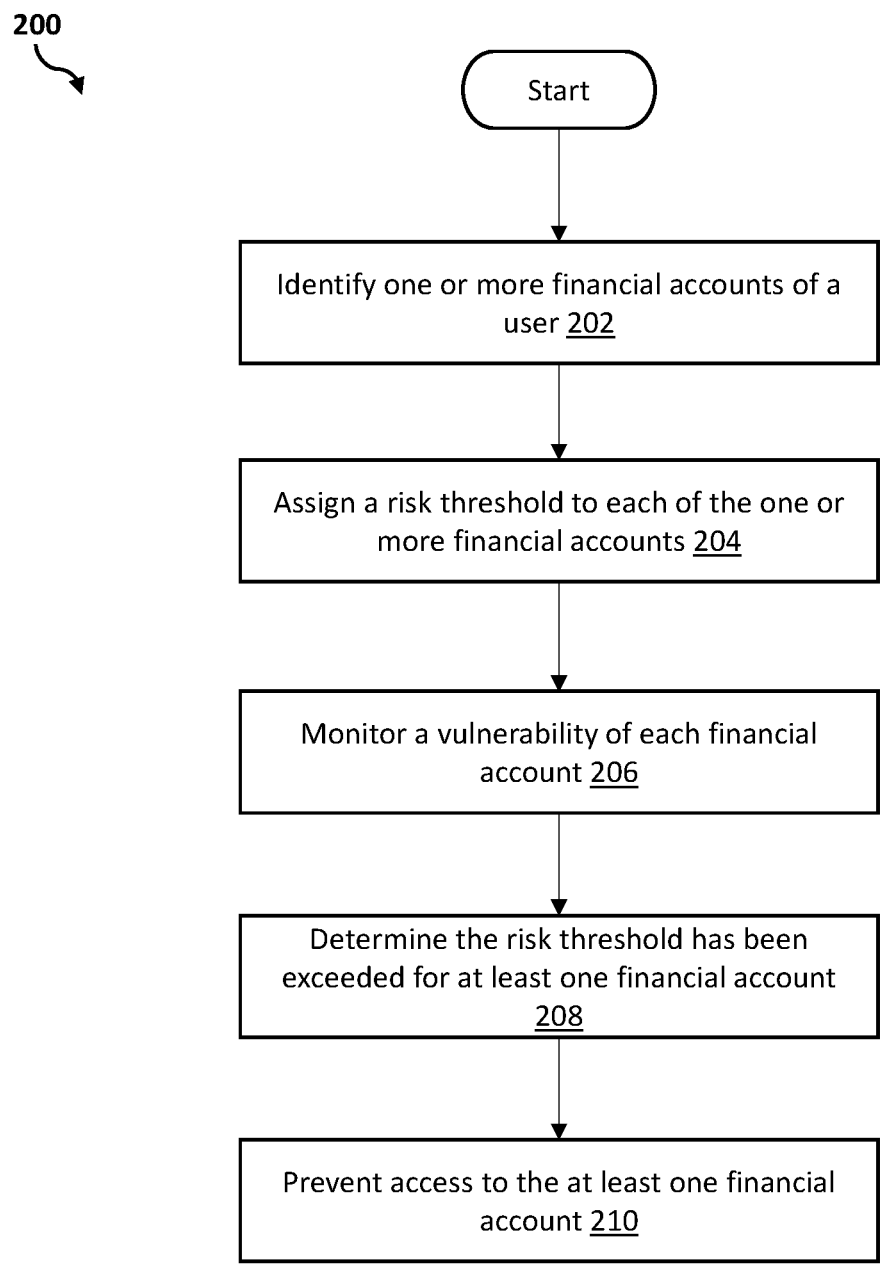
FIG. 2 is an operational flowchart illustrating a process for account security according to at least one embodiment.

Referring now to FIG. 2, an operational flowchart illustrating the exemplary account security process 200 used by the account security program 110a and 110b (hereinafter account security program 110) according to at least one embodiment is depicted.

At 202, the account security program 110 identifies one or more financial accounts of a user. The account security program 110 may require authorization from the user prior to identifying the one or more financial accounts of the user. The user may provide authorization in the account security user interface 120 using an authorized user device 122. The authorized user device 122 may be any type of device that is capable of accessing services from a cloud-based service provider, such as a desktop computer or a mobile endpoint device such as a mobile phone, a tablet computer, or a laptop computer, amongst other mobile endpoint devices. Although only a single authorized user device 122 may be illustrated, one or more authorized user devices 122 may be utilized. As will be explained in more detail below with respect to step 210, some embodiments may require two or more authorized user devices.

The account security user interface 120 may be displayed by the account security program 110 as an integration with a software application, such as, a dedicated software application or third party software application (e.g., financial institution software application). The user may access the user interface from one or more authorized user devices 122. Each of the financial accounts may be secured and/or maintained by a cloud based service, such as, but not limited to, IBM Cloud for Financial Services™ (IBM Cloud for Financial Services™ and all IBM-based trademarks are trademarks or registered trademarks of International Business Machines Corporation in the d States, and/or other countries), amongst other cloud based services. The cloud based service may utilize public cloud, private cloud, and/or hybrid cloud.

The one or more financial accounts of the user may include, but are not limited to including, at least one or more of, online payment system accounts, checking accounts, savings accounts, brokerage accounts, retirement accounts, peer-to-peer transactional accounts, cryptocurrency exchange accounts, digital wallets, and/or any other financial accounts in which a user may conduct financial transactions. As will be explained in more detail below, a type of financial account may be utilized in determining financial account attributes.

At 204, the account security program 110 may determine a risk threshold for each of the one or more financial accounts of the user. The account security program 110 may analyze at least user transactional data and/or financial account attributes in determining a risk threshold in determining the risk threshold for each of the financial accounts.

The account security program 110 may assign a different risk threshold to each of the financial accounts.

User transactional data may include, but is not limited to including, historical transactional data of the user, times of transactions, amounts in transactions, items purchased, accounts transacted with, withdrawal amounts, order history, shipping destinations of items, amongst other transactional data. The account security program 110 may receive consent from the user prior to receiving and/or accessing any user transactional data. The account security program 110 may derive the user transactional data from at least the one or more financial accounts of the user, e-commerce software applications, email confirmations, amongst other sources. The account security program 110 may store the user transactional data in a knowledge corpus (e.g., database 114).

Financial account attributes may depend on the type of financial account. As detailed above, the one or more financial accounts of the user may include, but are not limited to including, at least one or more of, online payment system accounts, checking accounts, savings accounts, brokerage accounts, retirement accounts, peer-to-peer transactional accounts, cryptocurrency exchange accounts, digital wallets, and/or any other financial accounts in which a user may conduct financial transactions. The financial account attributes may be determined based on at least, the types of transactions typically conducted on the financial account, the frequency of transactions typically conducted on the financial account, the typical times in which transactions are conducted on the financial account, amongst other data. The data used in identifying the financial account attributes may be sourced from publicly available information, a financial institution utilizing the account security program, transactional data stored in the knowledge corpus (e.g., database 114), amongst other sources.

For example, User 1 may have two financial accounts, a retirement account and a peer-to-peer transactional account. The retirement account has never been withdrawn from, receives funds on the $1^{st}$ and $15^{th}$ of each month, and makes purchases on the evenings of the $1^{st}$ and $15^{th}$ following the close of the market. The peer-to-peer transactional account has both received and sent funds, the transactions are not recurring, and the fund amounts received or sent have never exceeded $500 dollars. The account security program 110 may store financial account attributes such as, recurring deposits, no withdrawals, scheduled purchases in the knowledge corpus (e.g., database 114) with respect to the retirement account of the user. The account security program 110 may store financial attributes such as maximum transaction amount of $500 dollars in the knowledge corpus (e.g., database 114) with respect to the peer-to-peer transactional account of the user. The account security program 110 may dynamically store user transactional data and/or the financial account attributes in the knowledge corpus (e.g., database 114), such that similar data may replace and/or update previously stored data. In the above example, the account security program 110 may only store the most recent recurring deposit with respect to the retirement account of the user and may only store additional recurring deposits if funds were to be received for example on a different day other than the $1^{st}$ and $15^{th}$ of each month and/or in an amount differing from the recurring bi-weekly deposit.

The account security program 110 may determine the risk threshold for each of the financial accounts of the user. The account security program 110 may determine the risk threshold for each financial account based on at least the user transactional data and the attributes of the financial account. The risk threshold determined for each financial account may be different. The risk threshold assigned to a financial account may be a numerical value. The numerical value may be greater than 0 but less than 1. As will be explained below with respect to step 208, the risk threshold for each of the financial accounts may be compared to a vulnerability score by the account security program 110.

At 206, the account security program 110 monitors a vulnerability of each of the one or more financial accounts of the user. The account security program 110 may monitor the vulnerability of each financial account using a vulnerability score. The vulnerability score may be generated for each financial account based on user data received by the account security program 110.

User data may include, but is not limited to including, one or more of, calendar data, wearable data, location data, amongst other data which may be utilized in determining current and/or future activities of the user. All user data received and/or accessed by the account security program 110 shall not be construed as to violate or encourage the violation of any local, state, federal, or international law with respect to data privacy protection. The account security program 110 may require consent from the user prior to receiving and/or accessing any user data. The account security program 110 may intermittently confirm with the user to grant continued access to the user data. The account security program 110 may intermittently confirm the granted continued access to the user data with the user utilizing the account security user interface 120, amongst other methods or user interfaces, graphical or otherwise, of confirming the granted continued access. The user data may be stored by the account security program 110 in a knowledge corpus (e.g., database 114). The user may determine the duration of time in which the account security program 110 may store user data in the knowledge corpus (e.g., database 114).

Calendar data may include, but is not limited to including, work scheduling, meetings schedules, travel schedules, hotel bookings, flight criteria, event attendance, or any other data received and/or accessed by the account security program 110 consented to by the user. Calendar data may be derived from at least one or more of an email application, calendar application, social media application, amongst other applications of the authorized user device in which the account security program 110 has received consent from the user to receive and/or access calendar data. The user may also manually enter calendar data within the account security user interface 120.

Wearable data may include, but is not limited to including, blood pressure, heart rate, motion detection, identification of specific exercises, sleep time, biometric data, amongst other wearable data that may be gathered and/or may be gathered in the future from improvements in smart wearable devices. Wearable data may be received in real time by the account security program 110 from one or more smart wearable devices. Smart wearable devices may include, but are not limited to including, smart watches, smart wristbands, fitness trackers, body sensors, IoT (Internet of Things) devices, amongst other smart wearable devices that can be worn on the body of the user, carried by the user, and/or embedded into clothing of the user. The account security program 110 may receive consent from the user prior to receiving and/or accessing any wearable data and may require consent for each and every smart wearable device separately. The smart wearable device may also be one of the authorized user devices 122 if the smart wearable device may be capable of accessing services from a cloud-based service provider, performing financial transactions, and/or capable of confirming financial transactions. The user may authorize the smart wearable device as an authorized user device 122. For example, the user may perform a financial transaction using their credit card. The financial institution responsible for issuing the credit card to the user may send the user a text message (e.g., in instances where the user has consented to and enabled an integrated text messaging feature) to confirm the user was responsible for the financial transaction. The user may confirm by responding "YES" to the text message using a smart wearable device if the smart wearable device is an authorized user device 122.

Location data may include the location of the user, the location of each authorized user device 122, a home address of the user, a work address of the user, location data received from a financial account, amongst other location data. The account security program 110 may require consent from the user prior to receiving and/or accessing any location data. The account security program 110 may utilize one or more geolocation techniques in determining the location of the user and the location of each authorized user device. The one or more geolocation techniques may include, but are not limited to including, examining Wi-Fi hot spots, accessing one or more Global Positioning System (GPS) mobile applications of an authorized user device 122, receiving location data with respect to financial transactions, and/or updates from transportation applications. For example, the account security program 110 may receive location data indicating that the user has performed a financial transaction at the airport and/or an update from a transportation application such as an airline application that the user's ticket has been scanned to board a plane.

The account security program 110 may utilize the one or more sources of user data to confirm data received from each other source, as will be explained in more detail below, this may contribute to the determination of a confidence score. For example, a user may permit the account security program 110 access to both calendar data and/or location data. The user may have confirmed attendance on a social media application to an event. The account security program 110 may receive location data from an authorized user device 122 showing the user at the location of the event accessed through the social media application. In this example, the account security program 110 may determine with a high confidence score the user is at the event. The account security program 110 may also utilize one or more linguistic analysis techniques, in instances where the account security program 110 is granted access to microphone or other verbal data of the user, to analyze information associated with the event and determine the likely activity of the user. The one or more linguistic analysis techniques may include, but are not limited to including, a machine learning model with Natural Language Processing (NLP), Hidden Markov models (HMM), N-grams, Semantic Textual Similarity (STS), Keyword Extraction, amongst other linguistic analysis techniques, such as those implemented in IBM Watson® (IBM Watson and all Watson-based trademarks are trademarks or registered trademarks of international Business Machines Corporation in the United States, and/or other countries), IBM Watson® Speech to Text, IBM Watson® Tone Analyzer, IBM Watson® Natural Language Understanding, IBM Watson® Natural Language Classifier, amongst other implementations.

The account security program 110 may utilize user data to identify an activity and/or recurring activity of the user. The account security program 110 may utilize the account security user interface 120 to confirm the activity of the user. The account security program 110 may display one or more prompts and/or feedback mechanisms within the account security user interface 122 to identify activities and/or recurring activities. The account security program 110 may utilize the one or more prompts and/or feedback mechanisms for retraining the machine learning model in identifying an activity of the user. The account security program 110 may associate user data with a corresponding activity, the user data and the corresponding activity may be stored in the knowledge corpus (e.g., database 114) in identifying future user activities and/or activities of other users. The user data and the corresponding activity stored in the knowledge corpus (e.g., database 114) may not include any data relating to the identity of the user. For example, the user data received from a smart wearable device of the user may show an elevated heart rate between the hours of 7 a.m. and 8 a.m. as compared to heart rate data received from the user for all other hours of the day. Continuing with the example, the user data may show the user traveling at speeds between 15 and 25 m.p.h. during this period of elevated heart rate. The account security program 110 may display a prompt within the account security user interface, such as, "do you typically exercise between the hours of 7 a.m. and 8 a.m.?" and "is your typical morning exercise a bike ride?" in which the user can confirm the recurring activity of a morning bike ride. As will be explained in more detail below, the account security program 110 may provide one or more recommendations to the user based on the recurring activity, for example, limiting financial transactions between the hours of 7 a.m. and 8 a.m. Additionally, the account security program 110 may store the difference between the user's exercising heart rate and resting heart rate and the traveling speeds between 15 and 25 m.p.h. with the corresponding activity of "biking" in the knowledge corpus (e.g., database 114). As will be explained in more detail below, the data and corresponding activities stored in the knowledge corpus (e.g., database 114) may be utilized in identifying a user activity based on monitoring the user data. According to at least one embodiment, the account security program 110 may utilize general classifications (either alternatively or in addition to specific activities) when storing the data and corresponding activity in the knowledge corpus (e.g., database 114). For example, this may mean using "exercise" to classify data of activities such as "running" and "biking." The user may configure how activities are identified in the account security user interface 120.

The account security program 110 may utilize the user data in building a data structure of the user (e.g., object data structure) to be stored in the knowledge corpus (e.g., database 114). The data structure of the user may be modified based on user data received by the account security program 110 and may be accessed at least by the one or more machine learning models for generating the vulnerability score. The account security program 110 may utilize the data structure of the user to store user characteristics to be accessed by the machine learning model. The user characteristics may include, but are not limited to including, features, attributes, covariates, recurring activities, activities, amongst other user characteristics. Each of the user characteristics may include an associated value. The associated value may be determined based on previously identified vulnerabilities stored in the knowledge corpus (e.g., database 114). The previously identified vulnerabilities may include at least sequences of user data prior to a previous financial crime, the user characteristics associated with financial accounts previously hacked, manually created data sequences, publicly available data with respect to users vulnerable to financial crimes, data received from one or more financial institutions utilizing the account security program 110, and/or other data sourced and/or received by the account security program 110.

The account security program 110 may monitor the vulnerability of each financial account by generating the vulnerability score for each financial account of the user. The account security program 110 may utilize one or more machine learning models in generating the vulnerability score for each of the one or more financial accounts of the user. The one or more machine learning models may generate the vulnerability score in real time and/or at least in predetermined time increments. The one or more machine learning models may continuously generate the vulnerability score for each financial account at least each time user data is received by the account security program 110. The one or more machine learning models may access the data structure of the user (e.g., object data structure) stored in the knowledge corpus (e.g., database 114). The data structure of the user may be accessed at any time by the machine learning model and the machine learning model may generate the vulnerability score of each financial account utilizing at least the data structure of the user (e.g., object data structure), wherein the vulnerability score may be generated based on at least identified similarities of the data structure of the user with previously identified vulnerabilities. At least one of the one or more machine learning models may be a supervised machine learning model (e.g., supervised learning algorithm, such as logistic regression or a neural network). The supervised machine learning model may be trained using the previously identified vulnerabilities. The supervised machine learning model may utilize the user data received by the account security program 110 in generating the vulnerability score of the user. The vulnerability score may be the probability in which the financial account is susceptible to bad actors, such as those perpetrating fraud, cyberattacks, and/or other financial crimes. The vulnerability score may be a numerical value. The numerical value between 0 and 1, whereby a vulnerability score of 0 may be represent the lowest vulnerability and a vulnerability score of 1 may represent the highest vulnerability. For example, if there has been a previously identified vulnerability in Location 1, the supervised machine learning model may weight the vulnerability score of each financial account of the user higher if the user data received shows the user in the proximity of Location 1.

In an embodiment, the account security program 110 may provide one or more recommendations to the user. The account security program 110 may provide the one or more recommendations prior to a determination that a risk threshold being exceeded for at least one financial account. The one or more recommendations may be provided to the user through the account security user interface 122 and/or other methods of communication. The one or more recommendations provided by to the user by the account security program 110 may reduce the vulnerability of the one or more financial accounts of the user.

The one or more recommendations provided to the user may include, but are not limited to including, one or more rules, specific user recommendations, and general recommendations. The one or more rules may require user authorization prior to being applied by the account security program 110 and/or the user may authorize the account security program to automatically apply the one or more rules to one or more financial accounts. The account security program 110 may utilize one or more machine learning models in determining the one or more rules for the one or more financial accounts of the user. The one or more rules may include one or more financial transaction restrictions for the one or more financial accounts based on a probability the user is to perform a financial transaction. For example, the machine learning model may determine that there is a low probability of the user performing a financial transaction while exercising, and accordingly, if the machine learning model uses user data to determine the user is exercising, then the account security program 110 may recommend the user restrict financial transactions during this time.

The one or more rules recommended by the account security program 110 may be different for each of the one or more financial accounts. Continuing with the above example, the machine learning model may determine the user is exercising and there is a low probability of the user withdrawing money from their retirement account during the workout. Accordingly, the account security program 110 may recommend restricting financial transactions for the retirement account of the user during the workout. However, based on transactional data received from the user, the machine learning model may understand the user periodically purchases a water bottle during workouts. Accordingly, the account security program 110 may not recommend restricting financial transactions for the checking account of the user during workouts and/or may additionally or alternatively recommend imposing limited restrictions, such as $50 dollar maximum transactions during workouts imposed on the user's checking account.

In an embodiment, the account security program 110 may enable the user to modify the one or more rules for the one or more financial accounts in the account security user interface 120. In an embodiment, the account security program 110 may utilize a machine learning model in determining a safety score for the one or more financial accounts based on the one or more rules the user has authorized. The safety score may represent a current level of safety for a financial account based on one or more rules the user has authorized for the financial account. The safety score may be displayed for each of the one or more financial accounts by the account security program 110 in the account security user interface. The safety score may be a numerical value and may include labels (e.g., "bad," "fair," "good," "excellent") for ranges of numerical values (e.g., 300-600, 601-650, 651-700, 701-850). The safety score may be updated in real time based on user modifications to the one or more rules. For example, the account security program 110 may recommend applying one or more rules to a checking account and savings account of the user. The machine learning model may determine a safety score of 725 for the user's checking account and 745 for the user's savings account based on the one or more rules authorized by the user. The rules may restrict financial transactions over $150 dollars for the user's checking account and any financial transactions for the user's savings account between 3 a.m. and 6 a.m. The user, utilizing the account security user interface 120, may modify the financial transactions of the checking account rule to $500 dollars and modified the savings account rule to permit financial transactions pending a text message verification from an authorized user device 122. Accordingly, the machine learning model may determine the updated safety score for the user's checking account is 690 and the updated safety score for the user's savings account is 705. The account security program 110 may update the safety scores displayed to the user in the account security user interface 120 and/or send a notification to an authorized user device 122 that the score has been updated in accordance with the modified rules.

The one or more recommendations may also include recommendations specific to the user and/or general user recommendations. For example, a recommendation specific to the user may be recommending the user disable automatic connection to Wi-Fi based on the user data. The user data received by the account security program 110 may include calendar data of an upcoming flight, location data showing the user is on the way to the airport, and that the user has automatic connection to Wi-Fi enabled on one or more of their authorized user devices 122. Previously identified vulnerabilities stored in the knowledge corpus (e.g., database 114) may show user data sequences in which users with automatic Wi-Fi connection enabled at the same airport the user is flying out of experienced cyber-security threats. In this example, the account security program 110 may provide additional details on those cyber-security threats. In another example, a general recommendation to the user may be a recommendation that the user not use an account and routing number in a peer-to-peer transactional account. The general recommendation may be based on publicly available resource which detailed how bad actors may continue to perform financial transactions using peer-to-peer transactional accounts even after a victim has cancelled associated debit and/or credit cards using the account and routing number of a financial account saved within the peer-to-peer transactional account.

At 208, the account security program 110 determines the risk threshold has been exceeded for at least one of the one or more financial accounts. The account security program 110 may determine the risk threshold has been exceeded for the at least one financial account based on a comparison of the vulnerability score and the risk threshold assigned to the at least one financial account.

The account security program 110 may compare the vulnerability score and the risk threshold for each financial account utilizing the vulnerability score as an input variable and the risk threshold as a target variable. The account security program may continuously update the vulnerability score based on the real time updates of the one or more machine learning models. As described with respect to step 206 above, the account security program 110 may provide the one or more recommendations to the user prior to determining the risk threshold has been exceeded for the at least one financial account.

The account security program 110 may determine the risk threshold has been exceeded for at least one of the financial accounts of the user but not the other financial accounts of the user. For example, if based on the user data the account security program 110 determines one of the authorized user devices 122 is jeopardized but the jeopardized authorized user device 122 is only capable of accessing the cloud-based service of one financial account that financial account may be the only financial account in which the account security program 110 determined the risk threshold has been exceeded.

At 210, the account security program 110 prevents access to the at least one financial account in which the risk threshold has been exceeded. The account security program 110 may use one or more methods in preventing access to the at least one financial account of the user. The account security program 110 may determine the one or more methods in which the user may regain access. The account security program 110 may determine which of the one or more methods to use in preventing access and the one or more methods in which the user may regain access to the at least one financial account based on at least the user data and/or the previously identified vulnerabilities.

The one or more methods of preventing access to the at least one financial account in which the risk threshold has been exceeded, may include, but is not limited to including, preventing logins to a financial account, preventing withdrawals from a financial account, locking one or more debit and/or credit cards associated with the at least one financial account, reducing transactional amounts, preventing orders to addresses not previously associated with the user, preventing all transactions associated with the at least one financial account, amongst other methods of preventing access. The one or more methods of preventing access may also to apply to a secondary signer, the secondary signer may be a person other than the user having access to a financial account without having ownership of the financial account.

The one or more methods of regaining access to the at least one financial account in which access may be prevented, may include, but is not limited to including, voice recognition confirmation, text authorization, two-factor authentication, lapse of access prevention time period, authorization from an authorized user device 122 determined by the account security program, visiting a branch of the financial institution in which the at least one financial account is associated, law enforcement confirmation, security questions and answers, amongst other methods of regaining access.

For example, the account security program 110 may determine the risk threshold has been exceeded for at least one financial account of the user. The user data may show the user was in a location with a high crime rate, the user removed their smart wearable device at 11:30 p.m., and the user also had their mobile phone, which is an authorized user device 122, at the time the smart wearable device was removed. The risk threshold may have been exceeded for the at least one financial account in which the user's mobile phone is capable of accessing the cloud-based service for the financial account. Additionally, the sequence of user data is similar to previously identified vulnerabilities in which a user was robbed. Accordingly, the account security program 110 may limit the transactional amounts of the least one financial account. The account security program 110 may determine to limit the transactional amounts based on previously identified vulnerabilities in which the limiting of transactional amounts best ensured the safety of the user. The account security program 110 may after a time period prevent all logins to the at least one financial account accessible through the user's mobile phone. In determining which of the one or more methods of regaining access the account security program 110 may prevent regaining access by any means performable on the user's mobile device and/or smart wearable device, such as text or email confirmation. In this example, the account security program 110 may determine the method for regaining access is through an authorized user device in which the location data shows is at the home address of the user.

In an embodiment, the account security program 110 may utilize variable PIN codes and/or alternate passwords enabling a user to safely communicate a vulnerability risk of an authorized user device 122 and the at least one financial account accessible through that authorized user device 122. Upon the utilization of the variable PIN code and/or alternate password the account security program 110 may present an account security user interface 120 just as it would to the user, however, while all transactions may appear as if they are being performed the actions of the authorized user device 122 are being tracked and/or recorded, additionally the authorized user device 122 may identify one or more devices proximate to the jeopardized authorized user device and transmit those device identifications to an authorized user device that has not been jeopardized or to a device of a person in which the user has authorized. In the above example, the user may have provided the bad actors with a variable PIN code, such as 465611 when the user's passcode is actually 774455, the account security program 110 may begin tracking the activity of the bad actors and additionally identify the proximate device identifications to the user's desktop, an authorized user device 122, in which the user data indicates is at the home address of the user. Accordingly, the user may be able to escape safely and provide law enforcement with possible suspects and/or witnesses using the device identifications received by the user's laptop.

The account security program 110 may also change and/or protect sensitive information stored or accessible through the authorized user device upon usage of the variable PIN codes and/or alternate password. For example, account numbers may be scrambled, identification numbers altered, contacts modified, emails hidden, social media accounts backed up, amongst other methods of changing and/or protecting sensitive information.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
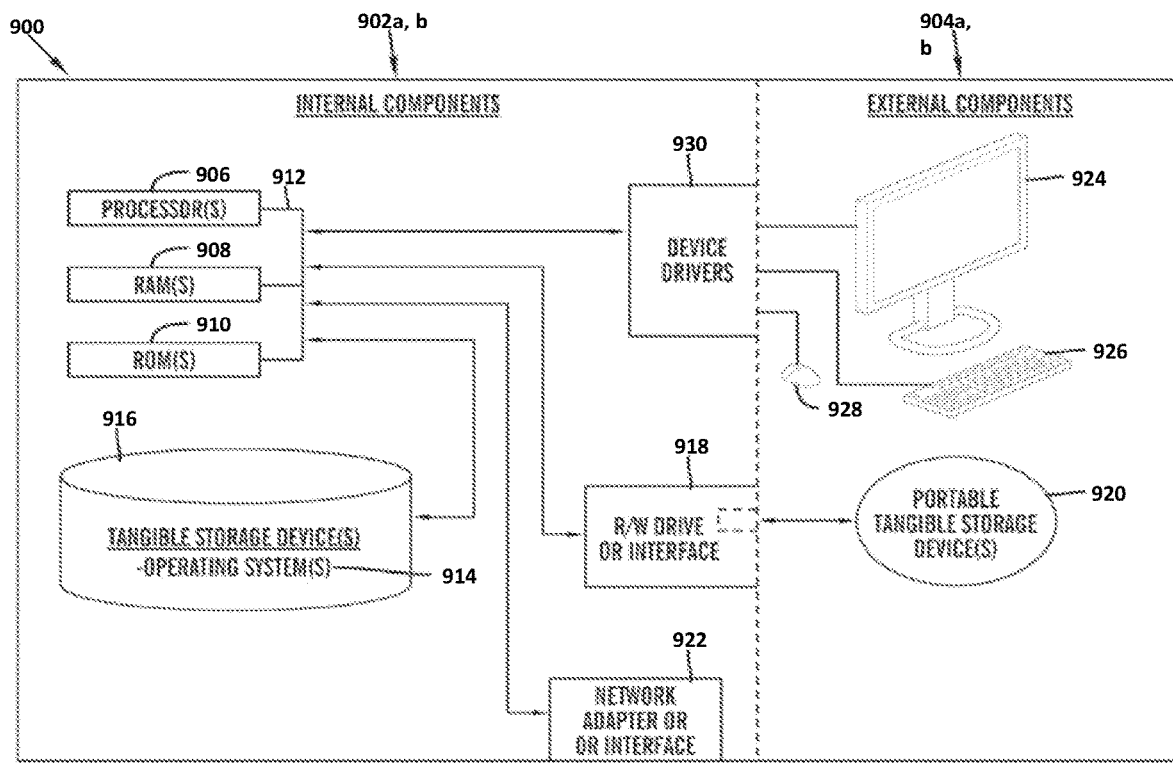
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the account security program 110a in client computer 102, and the account security program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the account security program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the account security program 110a in client computer 102 and the account security program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the account security program 110a in client computer 102 and the account security program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
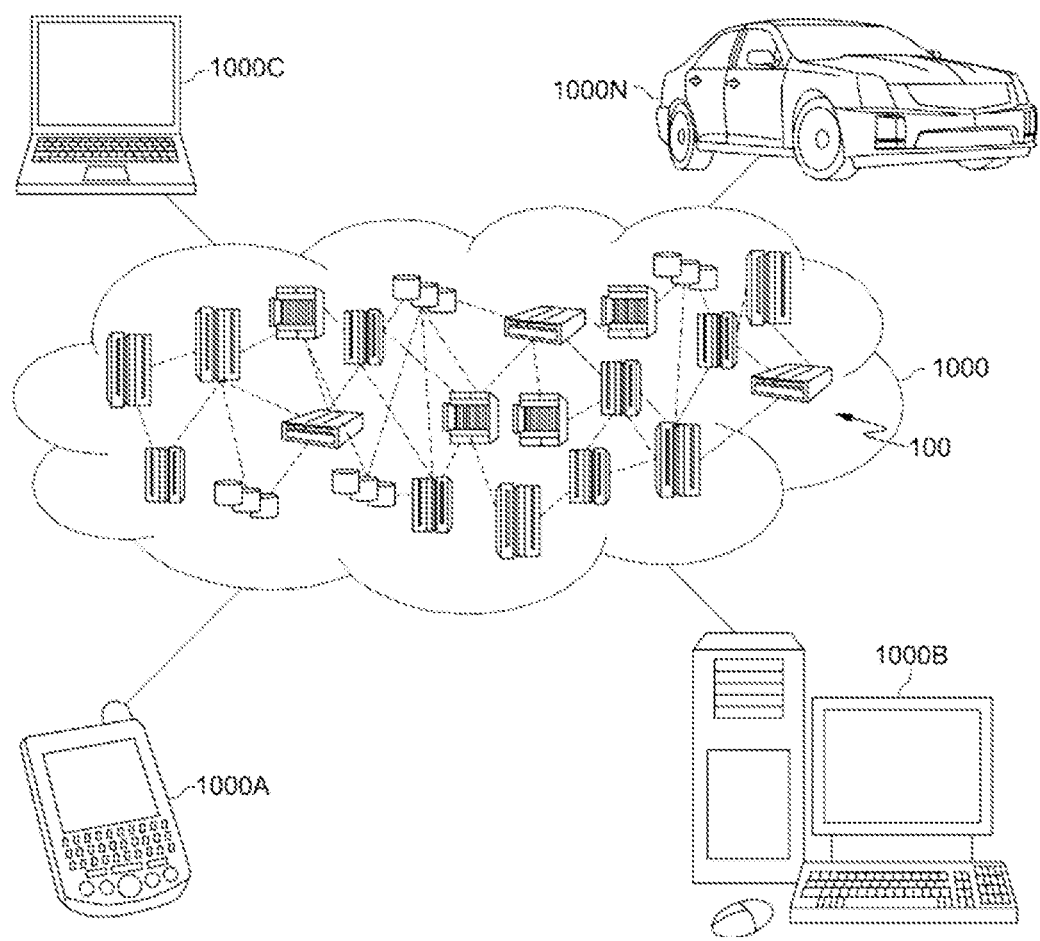
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
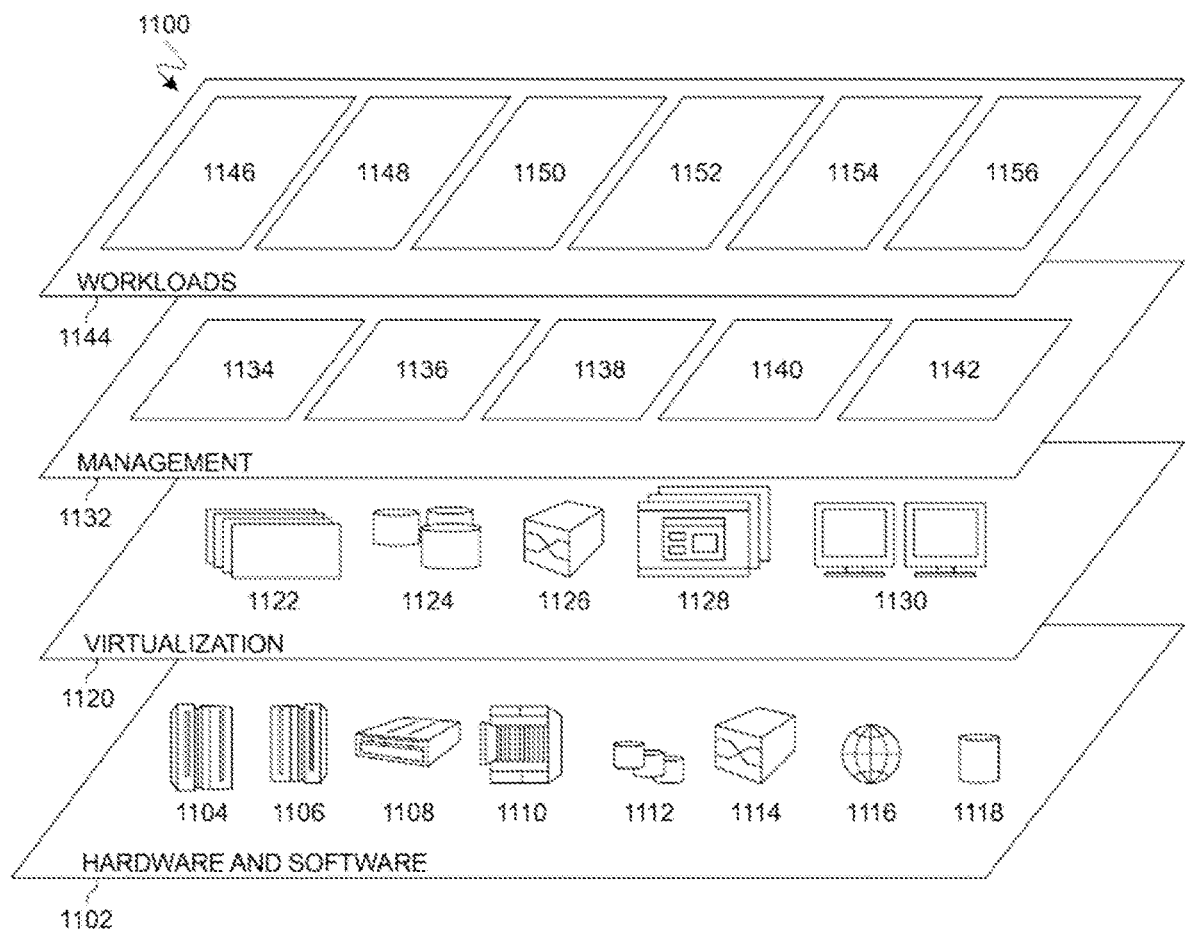
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and account security 1156. An account security program 110a, 110b provides a way to prevent access to at least one financial account in which a risk threshold has been exceeded.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for account security, the method comprising:
analyzing one or more financial accounts of a user and assigning a risk threshold to each of the one or more financial accounts;
monitoring a vulnerability of each of the one or more financial accounts, wherein the vulnerability is monitored using a vulnerability score, the vulnerability score being generated based on user data;
providing one or more recommendations to the user prior to the risk threshold of the one or more financial accounts being exceeded, wherein the one or more recommendations include at least one or more rules;
generating a safety score for each of the one or more financial accounts based on the one or more rules authorized by the user, wherein the safety score is displayed to the user in an account security user interface;
determining the risk threshold has been exceeded for at least one financial account based on a comparison of the vulnerability score and the risk threshold of the at least one financial account; and
preventing access to the at least one financial account in which the risk threshold has been exceeded.

2. The method of claim 1, wherein the vulnerability score is generated in real time for each of the one or more financial accounts using a supervised machine learning model, the supervised machine learning model utilizing at least a logistic regression algorithm.

3. The method of claim 1, wherein the access is prevented to the at least one financial account using one or more methods, and wherein the one or more methods are determined based on at least the user data and previously identified vulnerabilities.

4. The method of claim 1, further comprising:
determining one or more methods in which the user can regain access to the at least one financial account in which the access is prevented, wherein the one or more methods in which the user can regain access are determined based on at least the user data and previously identified vulnerabilities.

5. The method of claim 4, wherein determining the one or more methods in which the user can regain access includes analyzing a sequence of the user data, identifying one or more potentially compromised user devices based on location data, and requiring the user to regain the access from an authorized device determined to be uncompromised based on the location data.

6. The method of claim 1, wherein the one or more rules are determined using a machine learning model based on a probability the user will perform a financial transaction, and wherein the one or more rules are different for each of the one or more financial accounts.

7. The method of claim 6, wherein the machine learning model utilizes at least, one or more of, transactional data, financial account attributes, or user data in determining the one or more rules for each of the one or more financial accounts.

8. The method of claim 6, wherein the user modifies at least one of the one or more rules in the account security user interface, wherein the machine learning model generates an updated safety score in real time based the modifications of the user, wherein the updated safety score includes at least a numerical value and a label displayed to the user in the account security user interface.

9. The method of claim 1, further comprising:
receiving a variable Personal Identification Number (PIN) code from an authorized device of the user; and
presenting the one or more financial accounts of the user in the account security user interface, wherein sensitive information associated with the one or more financial accounts is altered and all transactions associated with the one or more financial accounts are tracked.

10. A computer system for account security, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
analyzing one or more financial accounts of a user and assigning a risk threshold to each of the one or more financial accounts;
monitoring a vulnerability of each of the one or more financial accounts, wherein the vulnerability is monitored using a vulnerability score, the vulnerability score being generated based on user data;
providing one or more recommendations to the user prior to the risk threshold of the one or more financial accounts being exceeded, wherein the one or more recommendations include at least one or more rules;
generating a safety score for each of the one or more financial accounts based on the one or more rules authorized by the user, wherein the safety score is displayed to the user in an account security user interface;
determining the risk threshold has been exceeded for at least one financial account based on a comparison of the vulnerability score and the risk threshold of the at least one financial account; and
preventing access to the at least one financial account in which the risk threshold has been exceeded.

11. The computer system of claim 10, wherein the vulnerability score is generated in real time for each of the one or more financial accounts using a supervised machine learning model, the supervised machine learning model utilizing at least a logistic regression algorithm.

12. The computer system of claim 10, wherein the access is prevented to the at least one financial account using one or more methods, and wherein the one or more methods are determined based on at least the user data and previously identified vulnerabilities.

13. The computer system of claim 10, further comprising:
determining one or more methods in which the user can regain access to the at least one financial account in which the access is prevented, wherein the one or more methods in which the user can regain access are determined based on at least the user data and previously identified vulnerabilities.

14. The computer system of claim 10, wherein the one or more rules are determined using a machine learning model based on a probability the user will perform a financial transaction, and wherein the one or more rules are different for each of the one or more financial accounts.

15. The computer system of claim 14, wherein the user modifies at least one of the one or more rules in the account security user interface, wherein the machine learning model generates an updated safety score in real time based the modifications of the user, wherein the updated safety score includes at least a numerical value and a label displayed to the user in the account security user interface.

16. A computer program product for account security, comprising:
one or more non-transitory computer-readable storage media and program instructions stored on at least one of the one or more tangible storage media, the program instructions executable by a processor to cause the processor to perform a method comprising:
analyzing one or more financial accounts of a user and assigning a risk threshold to each of the one or more financial accounts;
monitoring a vulnerability of each of the one or more financial accounts, wherein the vulnerability is monitored using a vulnerability score, the vulnerability score being generated based on user data;
providing one or more recommendations to the user prior to the risk threshold of the one or more financial accounts being exceeded, wherein the one or more recommendations include at least one or more rules;
generating a safety score for each of the one or more financial accounts based on the one or more rules authorized by the user, wherein the safety score is displayed to the user in an account security user interface;
determining the risk threshold has been exceeded for at least one financial account based on a comparison of the vulnerability score and the risk threshold of the at least one financial account; and
preventing access to the at least one financial account in which the risk threshold has been exceeded.

17. The computer program product of claim 16, wherein the vulnerability score is generated in real time for each of the one or more financial accounts using a supervised machine learning model, the supervised machine learning model utilizing at least a logistic regression algorithm.

18. The computer program product of claim 16, wherein the access is prevented to the at least one financial account using one or more methods, and wherein the one or more methods are determined based on at least the user data and previously identified vulnerabilities.

19. The computer program product of claim 16, further comprising:
determining one or more methods in which the user can regain access to the at least one financial account in which the access is prevented, wherein the one or more methods in which the user can regain access are determined based on at least the user data and previously identified vulnerabilities.

20. The computer program product of claim 16, wherein the one or more rules are determined using a machine learning model based on a probability the user will perform a financial transaction, and wherein the one or more rules are different for each of the one or more financial accounts.

* * * * *